Dec. 3, 1935.  C. F. ALSING  2,023,111
SILENT FAN
Filed Sept. 8, 1934  5 Sheets-Sheet 1

WITNESS

INVENTOR
Carl F. Alsing
BY
ATTORNEY

Dec. 3, 1935.  C. F. ALSING  2,023,111
SILENT FAN
Filed Sept. 8, 1934  5 Sheets-Sheet 2
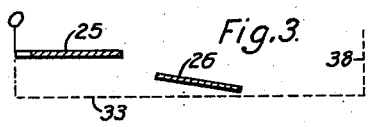
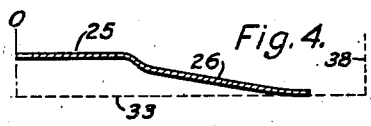
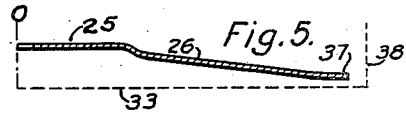
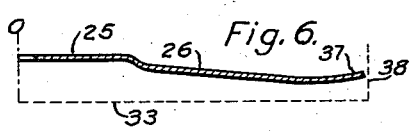
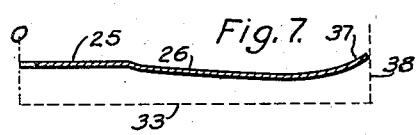
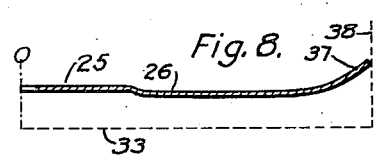
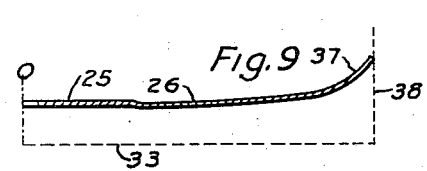
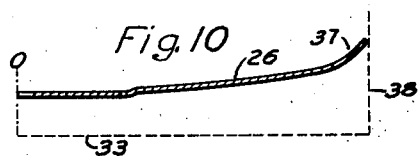
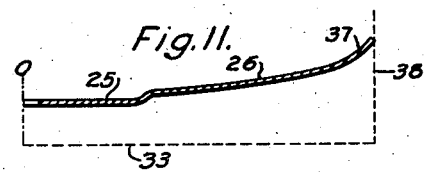
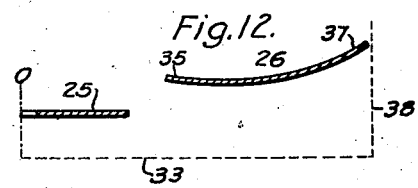
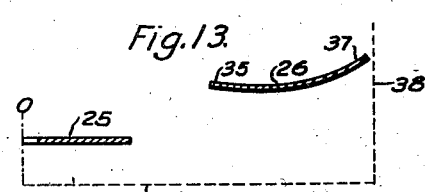
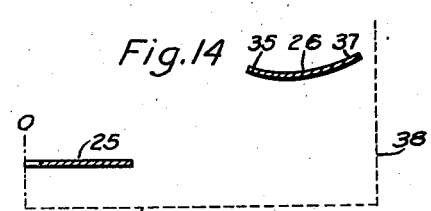
INVENTOR
Carl F. Alsing
ATTORNEY

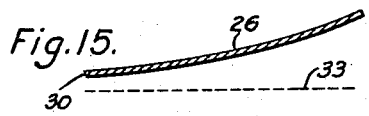
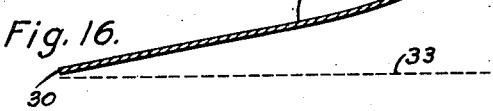
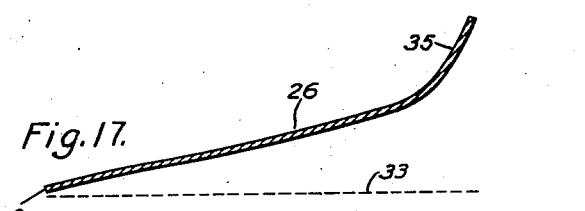
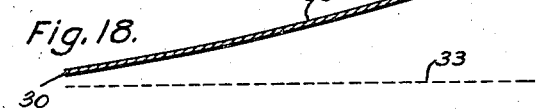
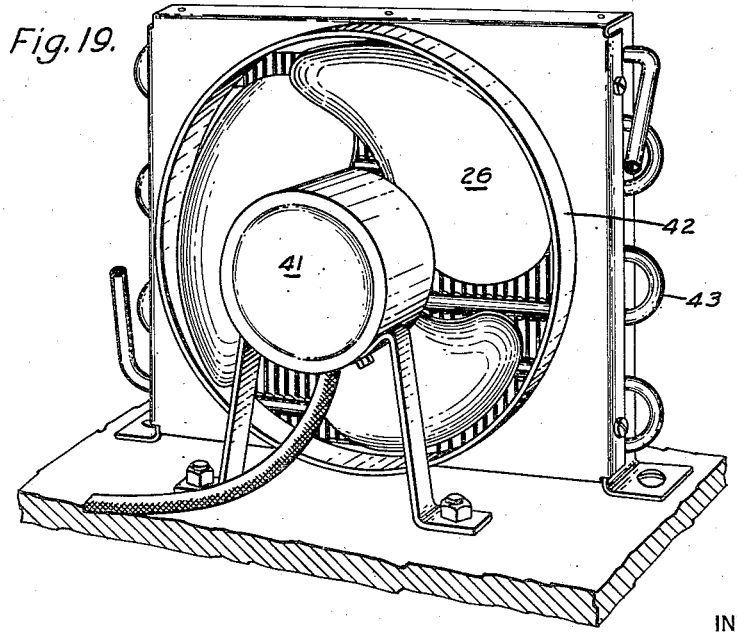

Dec. 3, 1935.  C. F. ALSING  2,023,111
SILENT FAN
Filed Sept. 8, 1934  5 Sheets-Sheet 4

INVENTOR
Carl F. Alsing
BY
ATTORNEY

Dec. 3, 1935.     C. F. ALSING     2,023,111
SILENT FAN
Filed Sept. 8, 1934     5 Sheets-Sheet 5
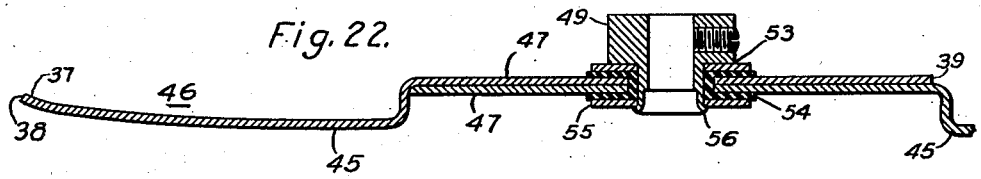
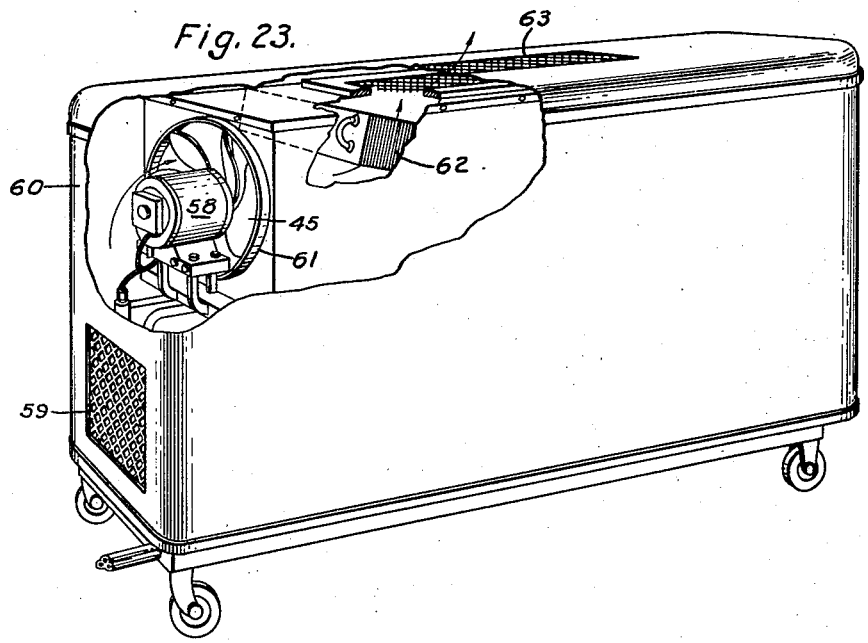
INVENTOR
Carl F. Alsing
BY
ATTORNEY Patented Dec. 3, 1935

2,023,111

UNITED STATES PATENT OFFICE 2,023,111

SILENT FAN

Carl F. Alsing, East Springfield, Mass., assignor to Westinghouse Electric & Manufacturing Company, East Pittsburgh, Pa., a corporation of Pennsylvania Application September 8, 1934, Serial No. 743,269
In Japan July 31, 1934

16 Claims. (Cl. 170—159)

My invention relates to propeller-type fans or blowers, and particularly to those which are designed and adapted to work against a slight pressure-head, such as for blowing or drawing air through a condenser of a refrigerator or an air-conditioning unit.

The principal object of my invention is to produce such a fan which is silent in operation.

A further object of my invention is to produce such a fan which is of a high efficiency.

A still further object of my invention is to produce such a fan having a blade element made of one or more sheet-metal punchings, in which there is achieved a minimum amount of waste material, resulting in a low cost and a low weight, the latter also resulting in freedom from vibration-troubles and bearing-troubles.

A still further object of my invention is to provide a yieldable, sound-deadening means between the fan blades and the shaft of the prime mover which drives it, so as to keep the noises of the prime mover from being transmitted to the fan-blades where they would be greatly amplified.

With the foregoing and other objects in view, my invention consists in the structures, combinations, applications and methods hereinafter described and claimed, and illustrated in the accompanying drawings, wherein:

Figs. 3 to 14 are sectional views of one of the blades, taken on radial planes at 10° intervals, as indicated by the section-lines O—3 to O—14, respectively, in Fig. 1;

Figs. 15 to 18 are sectional views representing the developments of the intersections of the fan blade with four concentric cylinders indicated by the lines 15—15 to 18—18, respectively, in Fig. 1;

Fig. 19 is a perspective view showing the application of my fan of Figs. 1 to 18 as a part of a refrigerator unit, said view showing the bladed fan-element as seen from the rear;

Fig. 22 is a sectional view, on a somewhat larger scale, on a radial plane indicated by the line 22—22 in Fig. 21, with the addition of the hub member for attaching the fan blades to a shaft which is not shown in Fig. 22; and Fig. 23 is a perspective view, partly in section, showing the application of my fan of Figs. 21 and 22 as a part of an air-conditioning unit.

Figure 1:
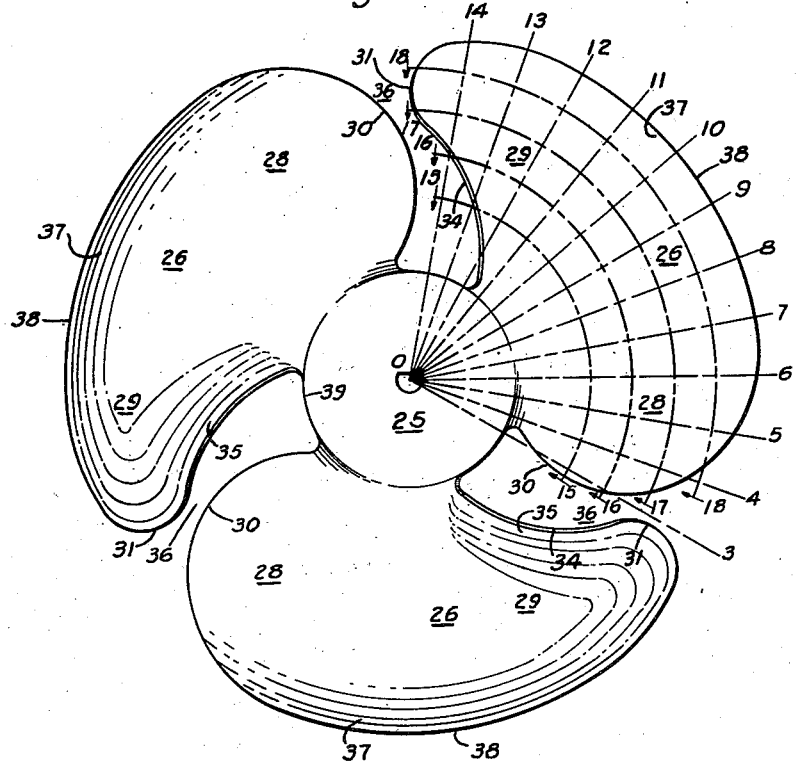
Figure 1 is a plan view of the bladed fan-element of a three-bladed fan constructed in accordance with my invention.

In the form of fan shown in Figs. 1 to 19, a three-bladed fan-element is utilized, the same being pressed from a single piece of sheet metal, such as steel or aluminum, so as to provide a central disc-portion 25 and three blades 26 which are integrally attached to the periphery of said disc-portion. These blades are longer circumferentially than their width measured radially, and are of an elongated stream-lined shape bent around circumferentially, so as to provide a relatively blunt-nosed entrance-portion 28, and a tapering trailing portion 29 which is relatively elongated in a circumferential direction. The leading edge 30 of the entrance portion is thus much blunter, or of a larger radius, than the trailing edge 31 of the trailing portion, the latter being much more pointed than the leading edge. Thus, I provide a blade of a well-known stream-lined shape, such as is common in some types of projectiles and in air-ships, speed-boats, and speedy land-vehicles. The rotation of the fan results in pushing this blade through the air with its blunt end foremost, and with its tapering end last, so as to produce a minimum of disturbance of the air in a rotational direction.

Figure 2:
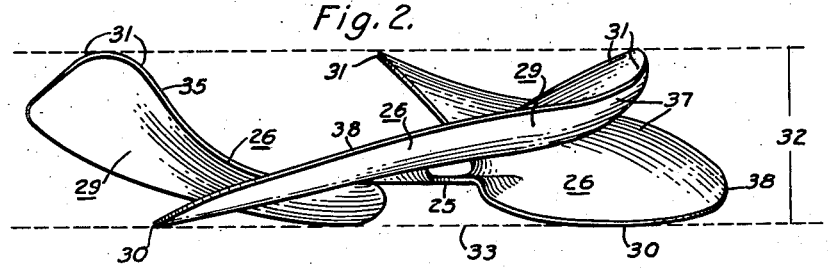
Fig. 2 is an elevation of the same.

As my fan, in its illustrated form, is utilized as a pressure-fan, that is, a fan designed to operate against a certain definite pressure-head, as distinguished from rotating in the air as in a desk fan, my fan has considerable depth to it, as shown by the dimension 32 in Fig. 2, this being brought about by a tilting or twisting of the fan blade, so that its entrance-portion is twisted backwardly out of the plane of the central disc-portion 25, whereas its trailing portion is twisted forwardly out of said plane.

For analytical purposes, it may be assumed, as a first rough approximation, that the air is stationary, when it is first struck by the leading edge 30 of the fan-blade, as any velocity which the air may have is certainly small as compared to the rotational velocity of the fan blade. It may be assumed, therefore, that each particle of air is given only a forward movement, exactly parallel with the axis of the fan, as the blade revolves behind it, that is, with the surface of the blade sliding behind the particle of air, so that the particle of air follows a path similar to the intercepts of the cylinders, as indicated by any one of the section-lines 15—15 to 18—18 of Fig. 1.

With this approximation in mind, I find it convenient to refer to the pitch, or angle of advance, of the fan-blade, which is the angle between the tangent of a surface at any point on the front or active surface of the blade, and the plane 33 of the fan, or a plane which is perpendicular to the axis of the fan, or in other words, the angle of the wedge which is thrust behind the air-particle at any point on the active surface of the blade, as the blade rotates while the air-particle stands still except for its being wedged forward in an axial direction.

Reference to Figs. 15 to 18 will show that, near the leading edge 30, the angle of advance, or entrance angle, is relatively small, over almost all of the leading edge of the fan, being preferably less than about 10° or 15°, depending somewhat on the designed speed of operation of the fan. This contributes materially to quiet operation.

As the fan-blade moves under the various particles of air which it is pushing forward, the angle of advance increases, in general, until, near the trailing edge 31, this angle becomes much greater, due to the curvature which is imparted to the fan blade. This relatively high angle of advance, or pitch as it is sometimes called, at the trailing edge of the fan, is largely produced by means of a forward curling of the inner edge 34 of the trailing portion 29, as indicated by the curved portion 35 in Figs. 1, 2, 12, 13, 14, 16, 17 and 18. This imparts a final force to the air, retarding its leakage through the openings 36 between the blades, which is particularly desirable in a pressure-fan. It is found that this curved portion 35 on the inner edge of the trailing portion materially increases the air-delivery, that is, the quantity of air delivered by the fan, without increasing the noise. It is thus an important part of my invention.

Another important feature of my invention, in the preferred form of construction thereof, is a forward curling which is imparted to most of the outer periphery of each fan-blade, as indicated by the numeral 37 in Figs. 1, 2 and 5 to 11. This peripheral curling or curvature 37 cooperates with the inner trailing-edge curved portion 35 to offset any tendency which the latter might have to throw the air off in a cone as it leaves the fan, instead of discharging it axially in a more or less cylindrical stream. The curvature 37 of the peripheral edge thus helps to make the air-delivery more nearly cylindrical, and it also constitutes materially to the quiet operation of the fan blade, as determined by an exhaustive series of experiments with blades of different shapes and curvatures. In a sense, it may be explained that the peripheral curvature prevents the escape of the air at the periphery of the fan, whereas the inner trailing-edge curvature prevents the escape of the air through the openings 36 between successive blades.

My fan-design is particularly adaptable to a small number of blades. It is preferable to utilize a small number of blades, which extend relatively long circumferentially, in preference to a larger number of blades of smaller circumferential extent.

It will be noted that my central disc-portion 25 is of rather considerable diameter, which is desirable, in a pressure-fan, in order to prevent the escape of air backwardly near the axis of the fan. In the particular designs shown in the drawings, it will be noted that the radial depth of the fan-blade, that is, the difference between the radius of the outer periphery 38 of the fan and the radius 39 of the disc portion 25, is something like one-half of the circumferential extent of each blade, that is, the distance measured by an arc extending from the front tip of the leading edge 30 to the rear tip of the trailing edge 31.

It will be noted from Figs. 1 and 2, that the percentage of coverage of my fan-blades 26 is very high, that is, the projected area of the fan-blades, including the central disc portion 25, is a fairly large percentage of the swept-out area of the fan, that is, the area of the circle included by the periphery 38 of the fan. This contributes materially to the effectiveness of the fan.

Fig. 19 shows a rear view of a fan such as that illustrated in Figs. 1 to 18, the same being driven by a motor 41 or other prime mover, which constitutes a part of a refrigerator unit. It will be noted that the fan is partially surrounded by a short cylindrical shroud 42, and that it delivers air through the coils of a condenser 43 of the refrigerator unit, so that the condenser, or other parts of the refrigerator unit through which the air must pass, interposes a certain resistance to the flow of air, constituting a certain pressure-head which must be overcome by the fan. My fan has been particularly designed for this service, for which it has been found, as the result of a series of very exhaustive tests, to be very efficient and exceptionally quiet.

It has also been found that my fan is very strong, and can be made from rather thin sheet-metal blanks. It will be noted that the curl or curvature of the inner and outer edges, as indicated at 35 and 37, results in a curved-sectioned blade which is extremely rigid and strong, so that the fan may be made very light in weight, thereby minimizing difficulties due to unbalances.

Figure 21:
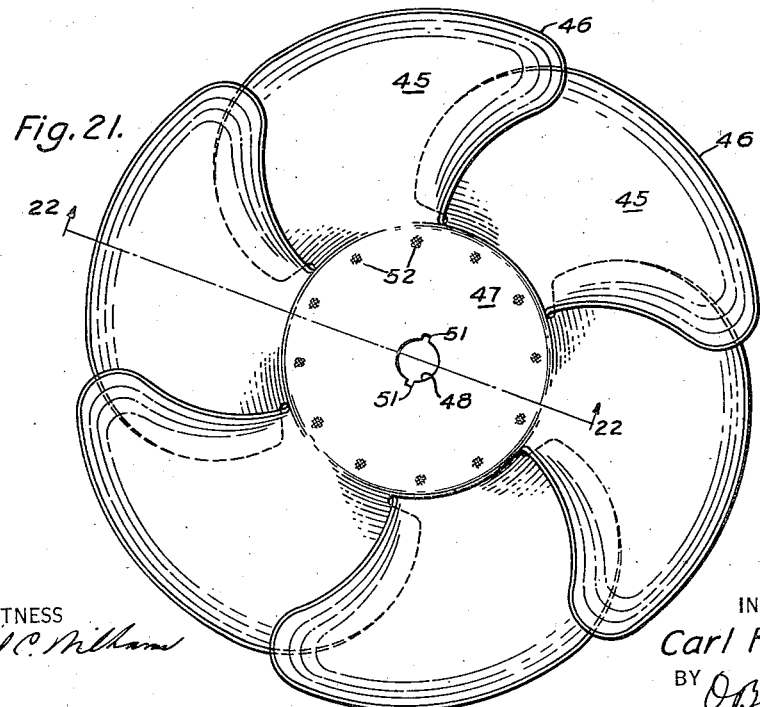
Fig. 21 is a plan view of the complete blade structure, comprising two elements such as are shown in Fig. 20.

In the form of my invention shown in Figs. 21 to 23, I utilize six fan blades 45, which overlap somewhat, so that they cannot all be punched from a single piece of sheet metal, as was the case of the fan shown in Figs. 1 to 19. Heretofore, no fan with overlapping blades has ever been punched with any of its blades integral with the central disc or hub of the fan, so far as I am aware, the blades of such fans having previously been invariably formed as separate pieces which were separately attached to arms emanating from the hub.

An important feature of my present invention is that it lends itself to the use of sheet-metal punchings, even in the case where the blades overlap each other, and hence cannot all be punched from a single sheet.

As shown in Figs. 21 and 22, such a fan is made up of two identical punchings 46, each punching comprising a central disc-portion 47 and three integral blades 45. The disc-portion 47 has a central perforation 48 adapted to fit over a hub-member 49 which is shown in Fig. 22.

Figure 20:
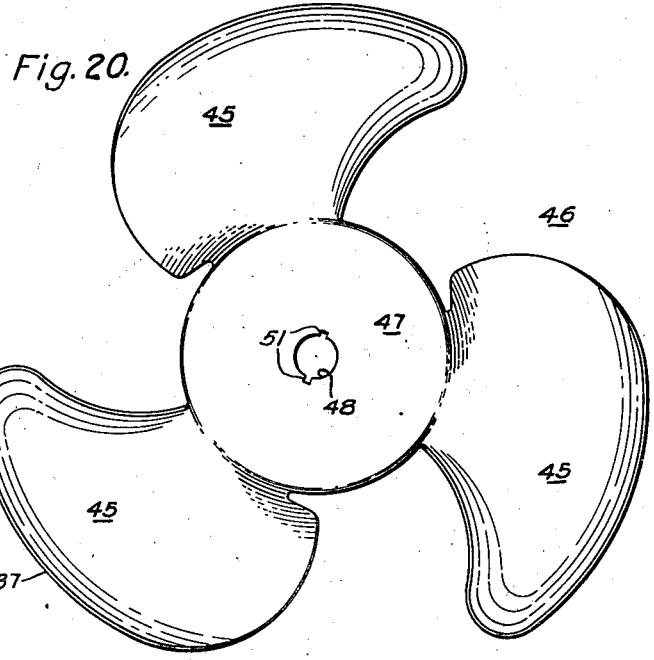
Fig. 20 is a plan view of one of two identical bladed fan-elements which are utilized in a modified form of construction of my fan.

It will be noted, in Figs. 20 and 21, that each of the punchings 46 is provided with a pair of diametrically opposite indices 51 which are illustrated in the form of notches or key-ways punched in the edge of the central perforation 48. These diametrically opposite indices 51, in conjunction with the fact that each punching 46 has an odd number of symmetrically spaced blades, facilitate the ready assembly of two punchings 46 in superposed relation, with one of the punchings rotated through exactly 180° with respect to the other, so that the assembled unit has an even number of symmetrically spaced blades, and the pair of indices 51 of one punching matches exactly with the pair of indices 51 of the other punching. This automatically compensates for any slight dissymmetry or unbalance in the individual punchings, because, if either punching is too heavy on one side, it will be compensated for, or balanced, by the other punching which has been rotated through 180° relatively thereto.

In the form of invention shown in Fig. 21, I preferably spot-weld the disc portions 47 of the two punchings 46 together, as indicated at 52, although any other holding or clamping means may be utilized in lieu thereof.

An improved hub-mounting for the fan is shown in Fig. 22, and it is to be understood that this form of mounting may be utilized with either form of my invention which is shown in the drawings. According to the form shown in Fig. 22, the hub-member 49 is provided with a shoulder 53, and the perforated disc-portions 47 of the assembled blade-unit are protected by a rubber grommet 54 or other yieldable, vibration-absorbing material, which is interposed between said disc-portion 47 and said shoulder 53, and between the perforation 48 of said disc-portion 47 and the hub-member 49, and also between said disc-portion 47 and a retaining element or washer 55, which is pressed tightly thereagainst in order to hold the assembled blade-unit firmly in position on the hub. This is readily accomplished by spinning up the end of the hub against the washer 55, as indicated at 56. The rubber grommet 54 is quite effective in deadening the transmission of noises from the shaft to which the hub element is adapted to be attached, to the fan-blades which would act as sounding boards for enormously amplifying any sounds transmitted from the prime-mover 58 (Fig. 23). This contributes materially to the quiet operation of the fan.

It will be understood that the fan-blades, in the form of my invention shown in Figs. 20 to 23, will be shaped similarly to the blades in the first-described form of my invention as shown in Figs. 1 to 19, except that, in Figs. 20 to 23, I utilize six slightly overlapping blades, whereas, in the other form, I utilize three non-overlapping blades.

By way of example, my six-bladed fan is shown, in Fig. 23, in its intended application as a part of an air-conditioning unit. The fan is driven by a motor or other prime mover 58, and is arranged so as to draw in air through a grille 59 in a housing 60, and thence through the fan and through a small cylindrical shroud 61 surrounding a part of the fan, whence it is discharged into a chamber from which the air passes through an inclined evaporator 62 of the air-conditioning unit, after which the air is ejected through a second grille 63 in the housing 60.

It will be understood that I have provided a light-weight fan, with inherent blade-curvatures insuring strength combined with lightness. I have also provided a construction whereby the material which is not employed in active work on the air is a very minimum, since I have avoided all unnecessarily thickened parts, thus still further reducing the weight and insuring minimum wear on the motor-bearings and minimum vibration due to unbalancing, besides contributing materially to a minimum weight of the entire unit or apparatus of which my fan constitutes a part.

The form of my invention shown in Figs. 20 to 23 is particularly advantageous, also, in automatically compensating for any dissymmetry or unbalance in the die, a single die being utilized for two punchings, which are so assembled that any slight unbalance of the individual punchings is automatically balanced out in the assembled unit.

While I have illustrated my invention in two preferred forms of embodiment, it will be understood that I am not altogether limited to the precise forms and shapes which are shown, or to the precise applications of my fans as illustrated in Figs. 19 and 23, respectively. I desire, therefore, that the appended claims shall be accorded the broadest construction consistent with their language and the prior art.

I claim as my invention:

1. A propeller-type fan having a plurality of blades, each blade having a relatively blunt-nosed entrance-portion and a trailing portion which is relatively elongated in a circumferential direction, the outer edge of each blade being curled and the inner edge of the trailing portion being curled.

2. A propeller-type fan having a plurality of blades, each blade having a relatively blunt-nosed entrance-portion and a trailing portion which is relatively elongated in a circumferential direction, the angle of advance, which is the angle between the tangent of a circle at any point on a blade and a plane perpendicular to the axis of the fan, being relatively small near the leading edge of the entrance-portion and being considerably larger near the trailing edge of the trailing portion.

3. A propeller-type fan having a plurality of blades, each blade having a relatively blunt-nosed entrance-portion and a trailing portion which is relatively elongated in a circumferential direction, the angle of advance, which is the angle between the tangent of a circle at any point on a blade and a plane perpendicular to the axis of the fan, being relatively small near the leading edge of the entrance-portion and being considerably larger near the trailing edge of the trailing portion, and the outer edge of each blade being curled.

4. A propeller-type fan having a plurality of blades, each blade being of an elongated stream-lined shape bent around circumferentially, said stream-lined shape being characterized by having a relatively blunt-nosed entrance-portion and a trailing portion which is relatively elongated in a circumferential direction, the inner edge of the trailing portion being curled.

5. A propeller-type fan having a plurality of blades, each blade having an elongated trailing portion of diminishing radial width as it approaches its tip, the outer edge of each blade being curled and the inner edge of the trailing portion being curled.

6. A light-weight propeller-type fan-element of warped, sheet-like material comprising a central disc-portion and a plurality of blades integrally attached to the periphery of said disc-portion, said blades extending circumferentially on at least one side of said points of attachment, and being curled forwardly on their inner and outer edges whereby a rigid, light-weight blade-structure is provided.

7. A light-weight propeller-type fan comprising a plurality of fan-elements of warped, sheet-like material, each fan-element comprising a central disc-portion and a plurality of blades integrally attached to the periphery of said disc-portion, said blades extending circumferentially on at least one side of said points of attachment, and being curled forwardly on their inner and outer edges whereby a rigid, light-weight blade-structure is provided, said plurality of fan-elements being secured together at their central disc-portions and together constituting a fan having overlapped blades.

8. A light-weight propeller-type fan comprising a plurality of fan-elements of warped, sheet-like material, each fan-element comprising a central disc-portion and a plurality of blades integrally attached to the periphery of said disc-portion, each blade being of an elongated streamlined shape bent around circumferentially, said stream-lined shape being characterized by having a relatively blunt-nosed entrance-portion and a trailing portion which is relatively elongated in a circumferential direction, said plurality of fan-elements being secured together at their central disc-portions and together constituting a fan having overlapped blades.

9. A light-weight propeller-type fan comprising a plurality of fan-elements of warped, sheet-like material, each fan-element comprising a central disc-portion and a plurality of blades integrally attached to the periphery of said disc-portion, each blade having a relatively blunt-nosed entrance-portion and a trailing portion which is relatively elongated in a circumferential direction, the angle of advance, which is the angle between the tangent of a circle at any point on a blade and a plane perpendicular to the axis of the fan, being relatively small near the leading edge of the entrance-portion and being considerably larger near the trailing edge of the trailing portion, said plurality of fan-elements being secured together at their central disc-portions and together constituting a fan having overlapped blades.

10. A light-weight propeller-type fan comprising two identical fan-elements of curved, sheet-like material, each fan-element comprising a central disc-portion and a plurality of integral blades peripherally attached to said disc-portion, the number of blades of each fan-element being an odd number, each fan-element having a pair of diametrically opposite indices, and the two fan-elements being secured together with their central disc-portions in contact with each other and with said diametrically opposite indices rotated through 180°, one with respect to the other, whereby any dissymmetry or unbalance in the individual fan-elements is compensated for to make a balanced fan.

11. A light-weight propeller-type fan-element of warped, sheet-like material comprising a central disc-portion and a plurality of blades integrally attached to the periphery of said disc-portion, each blade being of an elongated stream-lined shape bent around circumferentially, said stream-lined shape being characterized by having a relatively blunt-nosed entrance-portion and a trailing portion which is relatively elongated in a circumferential direction, said blades extending further circumferentially on the trailing-portion side of said points of attachment than on the entrance-portion side thereof.

12. A light-weight propeller-type fan-element of warped, sheet-like material comprising a central disc-portion and a plurality of blades integrally attached to the periphery of said disc-portion, each blade being of an elongated stream-lined shape bent around circumferentially, said stream-lined shape being characterized by having a relatively blunt-nosed entrance-portion and a trailing portion which is relatively elongated in a circumferential direction, said blades extending further circumferentially on the trailing-portion side of said points of attachment than on the entrance-portion side thereof, the angle of advance, which is the angle between the tangent of a circle at any point on a blade and a plane perpendicular to the axis of the fan, being relatively small near the leading edge of the entrance-portion and being considerably larger near the trailing edge of the trailing portion.

13. A light-weight propeller-type fan-element of warped, sheet-like material comprising a central portion and a plurality of blades attached to said central portion, said blades extending circumferentially on at least one side of said points of attachment, and being curled forwardly on their inner and outer edges whereby a rigid, light-weight blade-structure is provided.

14. A light-weight propeller-type fan-element comprising a central portion and a plurality of blades attached to said central portion, each blade being of an elongated stream-lined shape bent around circumferentially, said stream-lined shape being characterized by having a relatively blunt-nosed entrance-portion and a trailing portion which is relatively elongated in a circumferential direction, said blades extending further circumferentially on the trailing-portion side of said points of attachment than on the entrance-portion side thereof, the angle of advance, which is the angle between the tangent of a circle at any point on a blade and a plane perpendicular to the axis of the fan, being relatively small near the leading edge of the entrance-portion and being considerably larger near the trailing edge of the trailing portion.

15. A light weight propeller-type fan comprising a plurality of fan-elements of warped, sheet-like material, each fan-element comprising a central disc-portion and a plurality of blades attached to the periphery of said disc-portion, said blades extending circumferentially on at least one side of said points of attachment, said plurality of fan-elements being secured together at their central disc-portions and together constituting a fan having overlapped blades.

16. A light-weight propeller-type fan comprising two identical fan-elements of warped, sheet-like material, each fan-element comprising a central disc-portion and a plurality of integral blades peripherally attached to said disc-portion, the number of blades of each fan-element being an odd number, the two fan-elements being secured together with their central disc-portions in contact with each other and rotated through 180°, one with respect to the other, whereby any dissymmetry or unbalance in the individual fan-elements is compensated for to make a balanced fan.

CARL F. ALSING.